(12) United States Patent
Morimoto et al.

(10) Patent No.: US 6,430,145 B1
(45) Date of Patent: Aug. 6, 2002

(54) DISK SUPPORTING DEVICE

(75) Inventors: Takao Morimoto; Tatsunori Fujiwara, both of Tokyo; Masaki Kobayashi, Hyogo, all of (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/367,073

(22) PCT Filed: Dec. 25, 1997

(86) PCT No.: PCT/JP97/04852
§ 371 (c)(1),
(2), (4) Date: Oct. 12, 1999

(87) PCT Pub. No.: WO99/34365
PCT Pub. Date: Jul. 8, 1999

(51) Int. Cl.⁷ .............................................. G11B 25/04
(52) U.S. Cl. ....................................... 369/270; 369/271
(58) Field of Search .................................. 369/270, 271

(56) References Cited

U.S. PATENT DOCUMENTS 5,084,796 A * 1/1992 Uehara et al. ........... 360/99.12

FOREIGN PATENT DOCUMENTS

| GB | 2 088 113 A | * | 6/1982 |
| JP | 53 33452 | | 3/1978 |
| JP | 63 6550 | | 1/1988 |
| JP | 8 87825 | | 4/1996 |

* cited by examiner

Primary Examiner—William Klimowicz
(74) Attorney, Agent, or Firm—Birch, Stewart, Kolasch & Birch LLP (57) ABSTRACT

A disk holding device supports a disk as a recording medium. The disk holding device includes a motor rotating shaft (2) protruding upward from a driving motor (1); an upper (9) and lower bearing (10) which are disposed at an upper portion and a lower portion of the driving motor and rotatably support the motor rotating shaft; a thrust bearing (12) for supporting a bottom of the motor rotating shaft; a turntable (4) which is fitted coaxially to the motor rotating shaft at the protruding side of the motor rotating shaft mounting a disk (5); a disk clamping body (13) including, at its lower part, a disk clamping portion (13a) for clamping the disk in the same axial direction as the motor rotating shaft and, its upper part, a spherical protruding portion (13b) in the same axial direction as the motor rotating shaft; a motor fixing mount (3) to which the driving motor is fixed; a tension spring (8) bridged between the motor fixing mount and a pressing arm described later; and the pressing arm (14) one end of which is pivotally attached to the motor fixing mount, the other end of which includes an inclined portion (14a) with an inclination angle of 95° to 104° with respect to an axis of the motor rotating shaft, and which presses the spherical protruding portion of the disk clamping body in an axial direction of the motor rotating shaft and in a direction perpendicular to the motor rotating shaft.

19 Claims, 7 Drawing Sheets

DISK SUPPORTING DEVICE

This application is the national phase under 35 U.S.C. §371 of PCT International Application No. PCT/JP97/04852 which has an International filing date of Dec. 25, 1997 which designated the United States of America.

TECHNICAL FIELD

The present invention relates to a device for supporting a recording disk, and particularly to a disk holding device for supporting a disk as a recording medium, such as an optical disk device and a magneto-optical disk device.

BACKGROUND ART

There is a known disk as a recording medium of information signals, such as an optical disk and a magneto-optical disk. In a disk driving device, which information signals are recorded on and reproduced from a disk, the disk is positioned by a turntable fixed to a motor rotating shaft of a driving motor.

Figure 6:
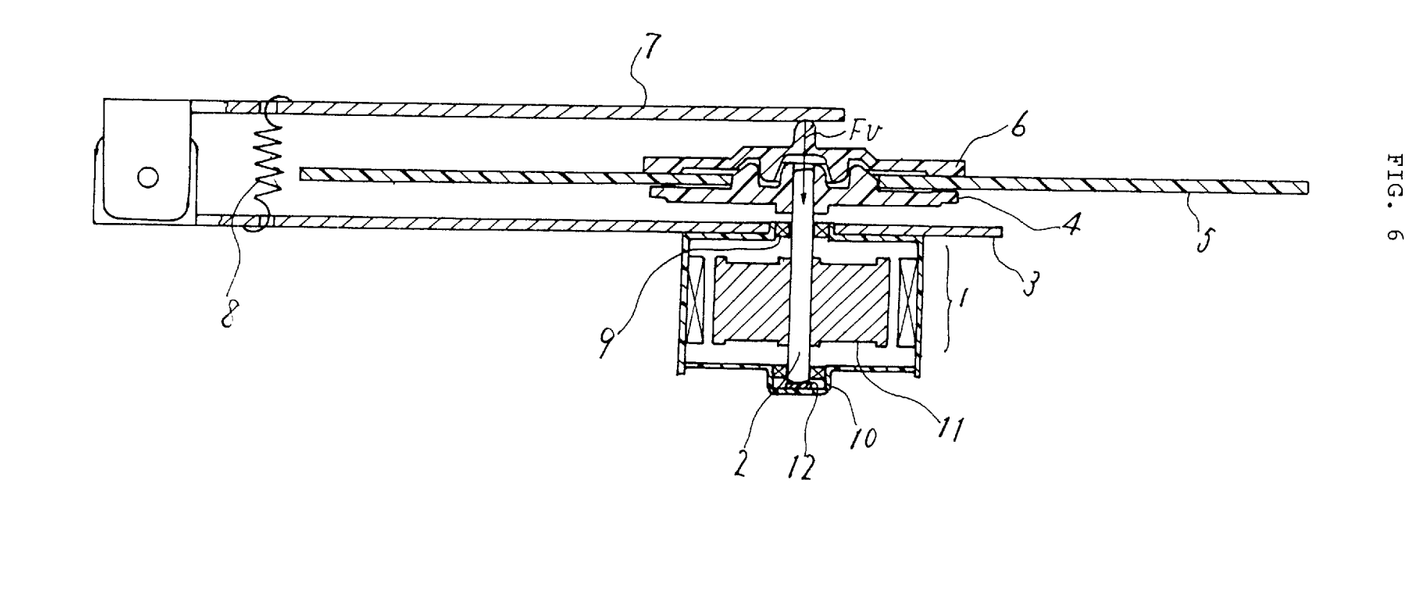
FIG. 6 is a sectional view showing a partial surface of a known disk holding device.

FIG. 6 is a sectional view showing a disk holding device of a known disk driving device. In FIG. 6, indicated by reference numeral 1 designates a driving motor, by 2 a motor rotating shaft, by 3 a motor fixing mount, by 4 a turntable, by 5 a disk, by 6 a disk clamping body, by 7 a pressing arm, by 8 a tension spring, by 9 an upper bearing, by 10 a lower bearing, by 11 a motor coil, and by 12 a thrust bearing.

The motor rotating shaft 2 is rotatably supported by the upper bearing 9 and the lower bearing 10, and is wound with the motor coil 11. The turntable 4 is fixed to the motor rotating shaft 2 so that they are formed in one unit, which is supported by the motor fixing mount 3. The disk 5 is clamped by the disk clamping body 6 pressed so as to be brought into press contact with the turntable 4 and the pressing arm 7 for pressing the disk clamping body 6 from above by the tension spring 8.

Pressing force Fu applied by the pressing arm 7 is supported by the thrust bearing 12 through the motor rotating shaft 2. When the driving motor 1 is driven, the motor rotating shaft 2 is rotated under the state that it is supported by the upper bearing 9, the lower bearing 10, and the thrust bearing 12.

Figure 7:
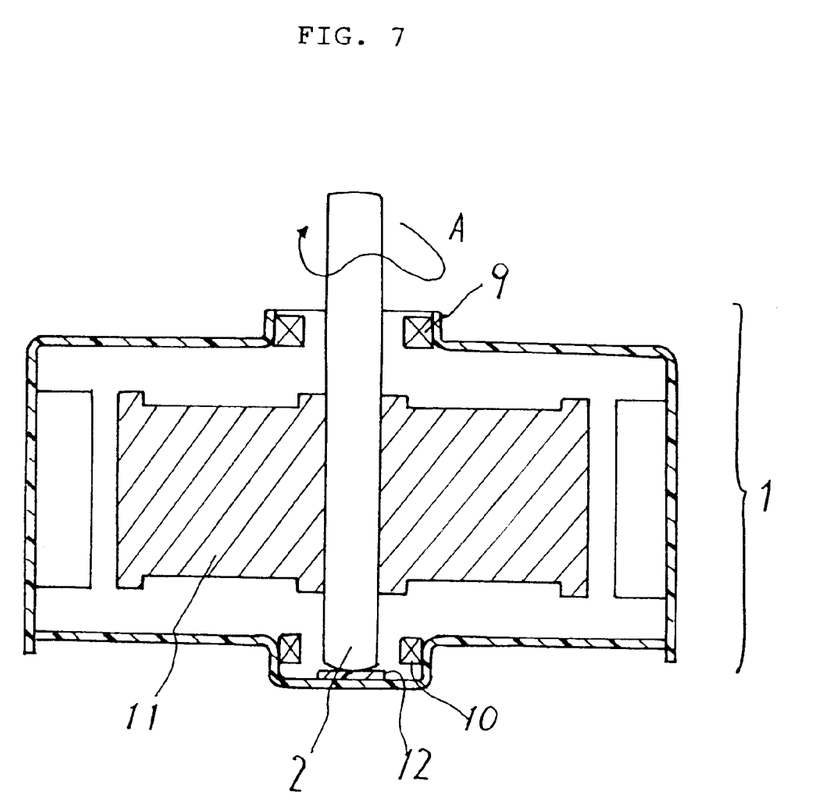
FIG. 7 is a sectional view showing a locus of end play (shaft backlash) becoming precession of a motor rotating shaft, which occurs when a driving motor of the known disk holding device is rotated.

However, since a known disk holding device is constructed as described above, in the case where a clearance exists between the motor rotating shaft 2 and the upper bearing 9 or the lower bearing 10, there has been a problem that when the driving motor is rotating, as shown by a locus A in FIG. 7, end play (shaft backlash) becoming so-called precession occurs, so that recording and reproducing capacity of the disk driving device is lowered.

Thus, the invention provides a disk holding device in which even in the case where there is a clearance between a motor rotating shaft and an upper bearing or a lower bearing of a driving motor, it is possible to suppress the occurrence of end play (shaft backlash) becoming so-called precession when the driving motor is rotating.

DISCLOSURE OF INVENTION

In a disk holding device of the invention, a protruding portion of a disk clamping member disposed in the same axial direction as a motor rotating shaft, which is rotatably supported by an upper bearing and a lower bearing and protrudes upward from a driving motor, is pressed in an axial direction of the motor rotating shaft and in a direction perpendicular to the motor rotating shaft by an inclined portion of a pressing member having a predetermined inclination angle with respect to an axis of the motor rotating shaft. By this, even in the case where there is a clearance between the motor rotating shaft and the upper bearing or the lower bearing, it is possible to suppress the occurrence of end play (shaft backlash) becoming so-called precession when the driving motor is rotating.

Moreover, the pressing member includes the inclined portion with an inclination angle of 95° to 104° with respect to the axis of the motor rotating shaft. By this, even in the case where there is a clearance between the motor rotating shaft and the upper bearing or the lower bearing, it is possible to suppress the occurrence of end play (shaft backlash) becoming so-called precession when the driving motor is rotating.

Moreover, the disk clamping member includes the spherical protruding portion pressed by the inclined portion of the pressing member. By this, even in the case where there is a clearance between the motor rotating shaft and the upper bearing or the lower bearing, it is possible to suppress the occurrence of end play (shaft backlash) becoming so-called precession when the driving motor is rotating.

Moreover, the clamping member includes the cylindrical protruding portion pressed by the inclined portion of the pressing member. By this, even in the case where there is a clearance between the motor rotating shaft and the upper bearing or the lower bearing, it is possible to suppress the occurrence of end play (shaft backlash) becoming so-called precession when the driving motor is rotating. Further, as compared with the case where the spherical protruding portion is brought into surface contact with the inclined portion of the pressing member, rotation load due to contact can be reduced by making line contact with the cylindrical protruding portion.

Moreover, the disk clamping member includes the conical protruding portion pressed by the inclined portion of the pressing member. By this, even in the case where there is a clearance between the motor rotating shaft and the upper bearing or the lower bearing, it is possible to suppress the occurrence of end play (shaft backlash) becoming so-called precession when the driving motor is rotating. Further, as compared with the case where the spherical protruding portion is brought into surface contact with the inclined portion of the pressing member, rotation load due to contact can be reduced by point contact with the conical protruding portion.

Moreover, in a disk holding device of the invention, a protruding portion of a disk clamping member provided in the same axial direction as a motor rotating shaft, which protrudes upward from a driving motor, is pressed in an axial direction of the motor rotating shaft and in a direction perpendicular to the motor rotating shaft by an inclined portion of a pressing member having a predetermined inclination angle with respect to an axis of the motor rotating shaft. By this, when the driving motor is rotating, it is possible to suppress the occurrence of end play (shaft backlash) becoming so-called precession in the motor rotating shaft.

BEST MODE FOR CARRYING OUT THE INVENTION

For the purpose of describing the invention in more detail, this will be described in accordance with the attached drawings.

Figure 1:
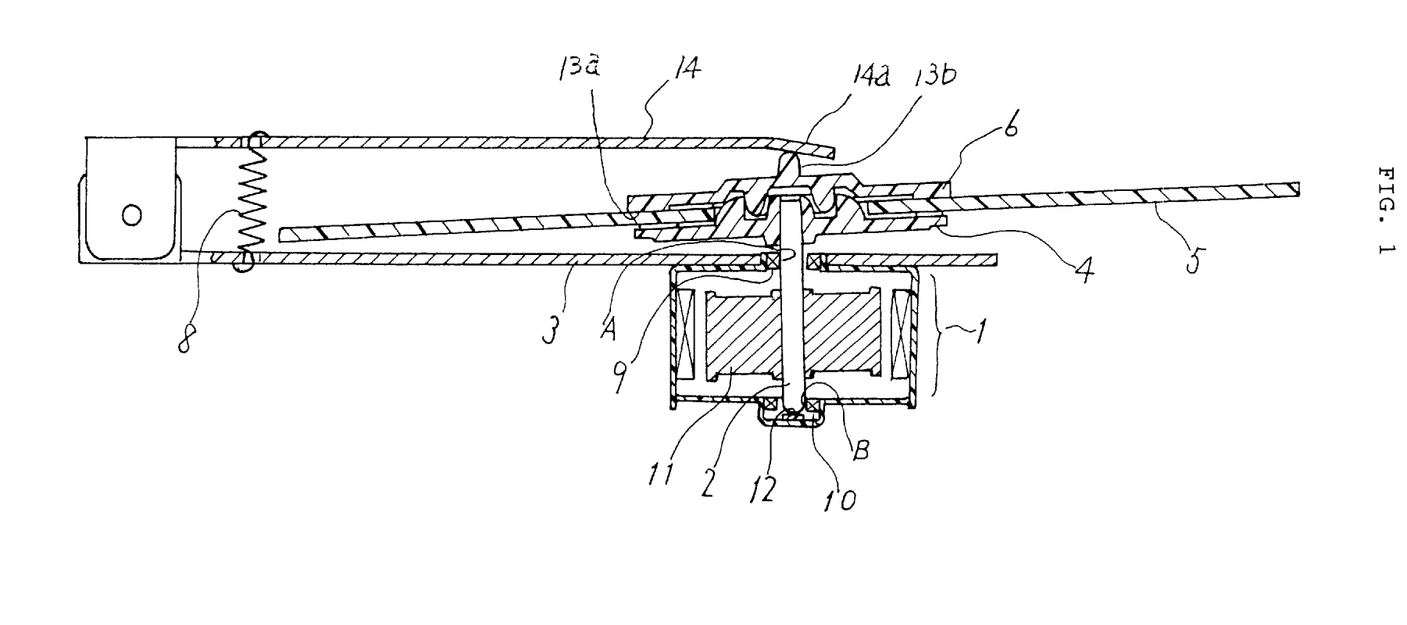
FIG. 1 is a sectional view showing a partial surface of a disk holding device according to a first embodiment of the invention.

FIG. 1 is a sectional view showing a partial surface of a disk holding device according to a first embodiment of the invention. In FIG. 1, the disk holding device includes a motor rotating shaft 2 protruding upward from a driving motor 1 and made of stainless; an upper bearing 9 and a lower bearing 10 which are disposed at an upper portion and a lower portion of the driving motor 1, rotatably support the motor rotating shaft 2, and are made of oil-impregnated sintered bearings; a thrust bearing 12 for supporting the bottom of the motor rotating shaft 2 and made of polyamide resin; a turntable 4 which is coaxially fitted to the motor rotating shaft 2 at a protruding side of the motor rotating shaft 2, mounts a disk 5, and is made of polyacetal resin; a disk clamping body 13 made of polyacetal resin and including, as its lower part, a disk clamping portion 13a for clamping the disk 5 in the same axial direction as the motor rotating shaft 2 and, as its upper part, a spherical protruding portion 13b in the same axial direction as the motor rotating shaft 2; a motor fixing mount 3 to which the driving motor 1 is fixed and which is made of metal; a tension spring 8 bridged between the motor fixing mount 3 and a pressing arm described later; and the pressing arm 14 which is made of stainless steel or the like, one end of which is pivotally attached to the motor fixing mount 3, the other end of which includes an inclined portion 14a with an inclination angle of 95° to 104° with respect to an axis of the motor rotating shaft 2, and which presses the spherical protruding portion 13b of the disk clamping body 13 by the tension spring 8 in an axial direction of the motor rotating shaft 2 and in a direction perpendicular to the motor rotating shaft 2.

Figure 2:
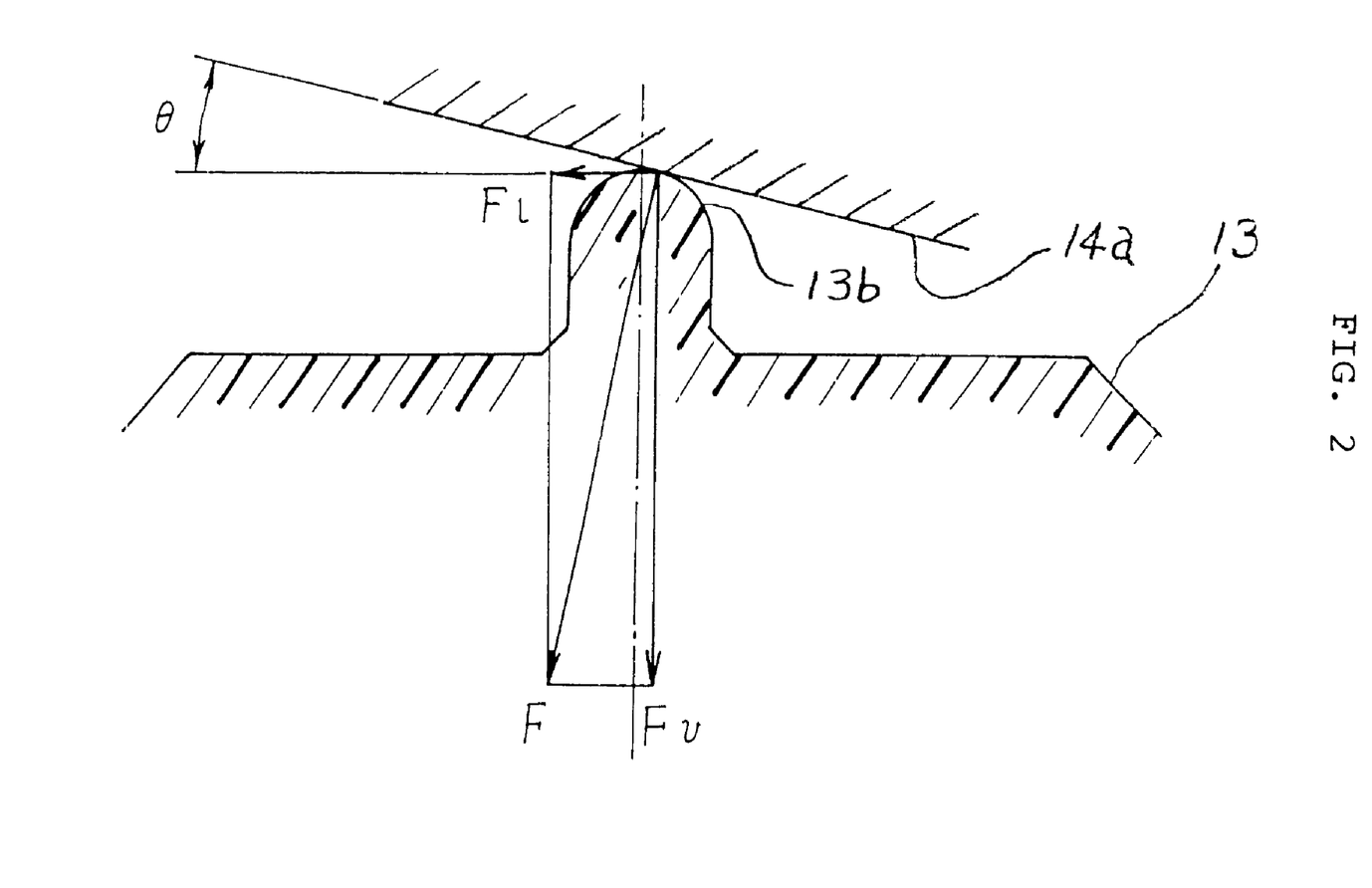
FIG. 2 is a main part section view showing pressing force applied to a contact portion between a disk clamping body and a pressing arm.

As shown in FIG. 2, the inclined portion 14a applies pressing force Fυ in the axial direction of the motor rotating shaft 2 and pressing force Fι in the direction perpendicular to the motor rotating shaft 2 to the spherical protruding portion 13b by the tension spring 8. By this, as shown in FIG. 1, such a state is realized that the motor rotating shaft 2 is always brought into contact with the upper bearing 9 at portion A and the motor rotating shaft 2 is always brought into contact with the lower bearing 10 at portion B.

The reason why the inclined portion 14a has an inclination angle of 95° to 104° with respect to the axis of the motor rotating shaft 2 will be described with reference to FIG. 2. In FIG. 2, when an angle of the inclined portion with respect to a direction perpendicular to the motor rotating shaft 2 is θ, pressing force F applied by the inclined portion 14a of the pressing arm 14 is divided into partial force of pressing force Fυ=F cos θ in the axial direction of the motor rotating shaft 2 and partial force of pressing force Fι=F sin θ in the direction perpendicular to the motor rotating shaft 2.

Figure 3:
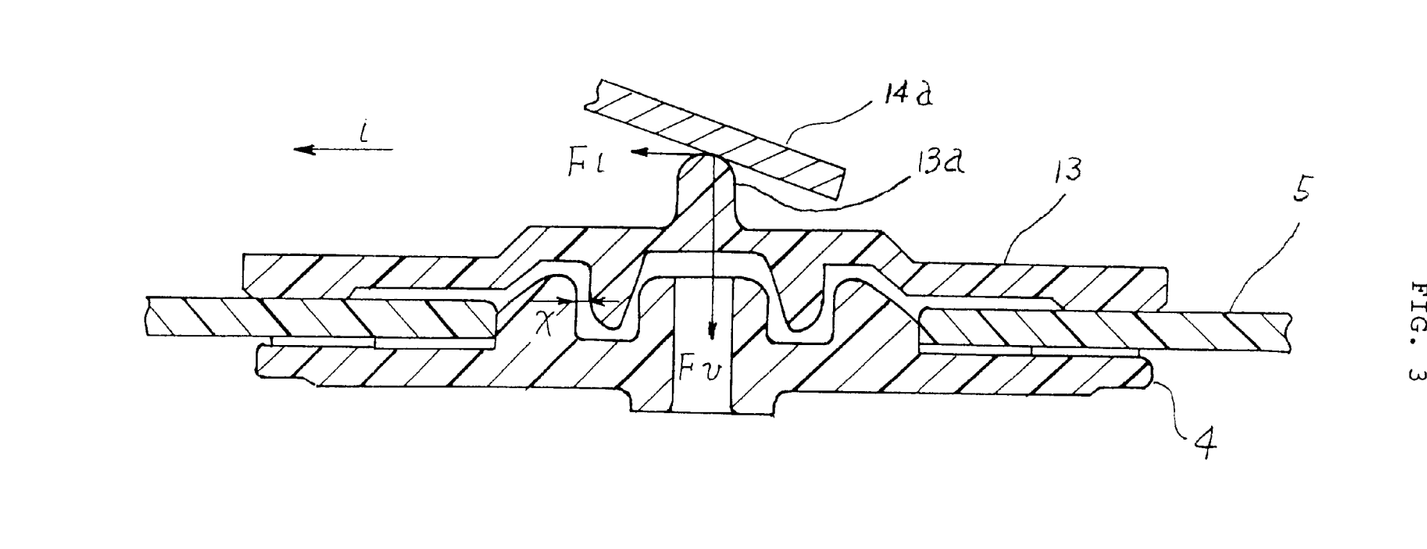
FIG. 3 is a main part sectional view showing contact relation among a turntable, a disk, a disk clamping body, and a pressing arm.

In general, the disk 5 is made of polycarbonate resin and the disk clamping body 13 is made of polyacetal resin. There is a coefficient of friction (=μ) of 0.25 to 0.3 between these two kinds of resins. As shown in FIG. 3, a clearance of X is set between the turntable 4 and the disk clamping body 13. If Fι is excessively high, there is a problem that the disk 5 and the disk clamping body 13 slide, and movement in the ι direction occurs, so that recording and reproducing capacity of the disk driving device is lowered. When μ=0.25, 0.25>Fι/Fυ=F sin θ/F cos θ=tan θ is required, and an angle of θ<14° becomes necessary.

On the other hand, as shown in FIG. 1, for the purpose of realizing such a state that the motor rotating shaft 2 is always brought into contact with the upper bearing 9 at the portion A and the motor rotating shaft 2 is always brought into contact with the lower bearing 10 at the portion B, the relation of 5°<θ has been obtained from experiments. Thus, θ is made 5°<θ<14°, that is, the inclined portion 14a is provided with an inclination angle of 95° to 104° with respect to the axis of the motor rotating shaft 2, so that the inclined portion 14a applies pressing force Fυ in the axial direction of the motor rotating shaft 2 and pressing force Fι in the direction perpendicular to the motor rotating shaft 2 to the spherical protruding portion 13b. This causes such a state that the motor rotating shaft 2 is always brought into contact with the upper bearing 9 at the portion A and the motor rotating shaft 2 is always brought into contact with the lower bearing 10 at the portion B.

As a result, the disk holding device can be provided in which even in the case where a clearance exists between the motor rotating shaft 2 and the upper bearing 9 or the lower bearing 10, it is possible to suppress the occurrence of end play (shaft backlash) becoming so-called precession when the driving motor 1 is rotating.

Moreover, the disk holding device can be provided in which it is possible to suppress the occurrence of movement in the ι direction due to sliding of the disk 5 and the disk clamping body 13, and the clearance of X between the turntable 4 and the clamping body 13 can be held at a predetermined clearance.

In the foregoing embodiment, although the upper bearing 9 and the lower bearing 10 are provided, it is also possible to construct such that the upper bearing 9 and the lower bearing 10 are not provided, and the motor rotating shaft 2 may be directly brought into contact with places where the upper bearing 9 and the lower bearing 10 were provided.

Next, a disk holding device according to other embodiments will be described with reference to FIGS. 4 and 5.

Figure 4:
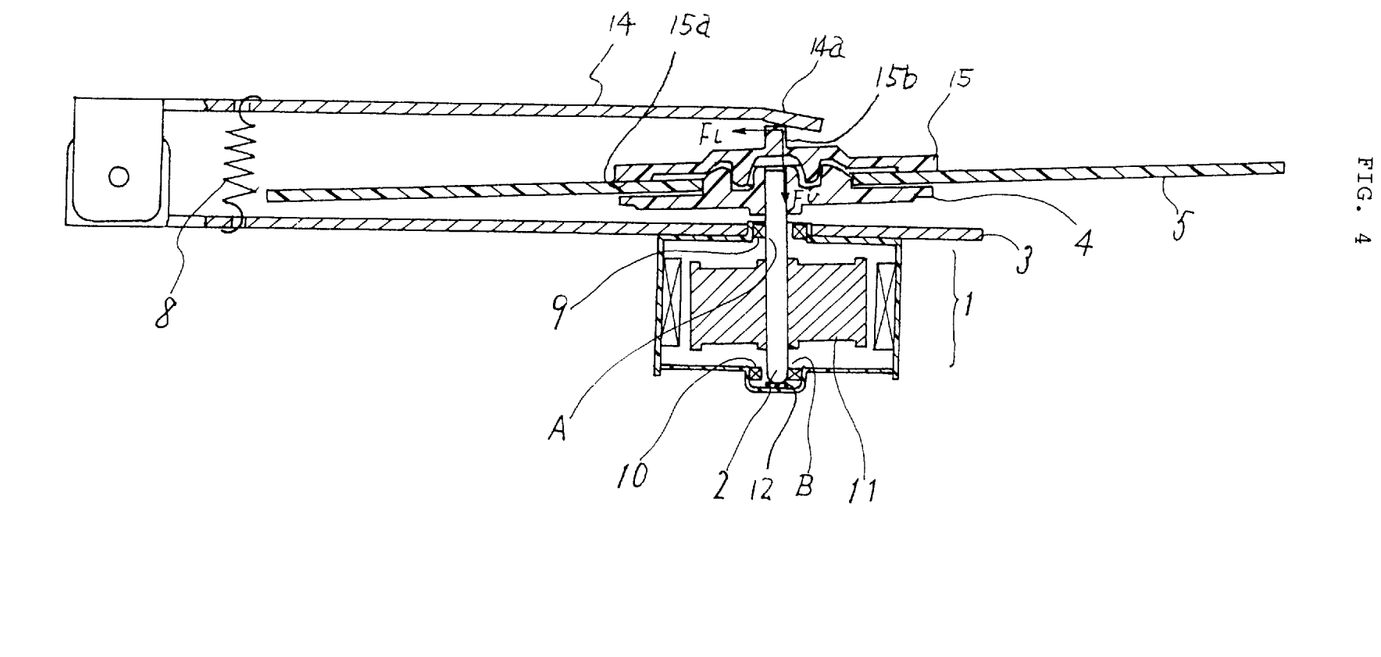
FIG. 4 is a sectional view showing a partial surface of a disk holding device according to a second embodiment of the invention.

FIG. 4 is a sectional view showing a partial surface of a disk holding device according to a second embodiment. In FIG. 4, a difference from FIG. 1 is that a disk clamping body 15 is made of polyacetal resin, and includes, at its lower part, a disk clamping portion 15a for clamping the disk 5 in the same axial direction as the motor rotating shaft 2 and, at its upper part, a cylindrical protruding portion 15b in the same axial direction as the motor rotating shaft 2. As a result, functions and effects similar to the first embodiment are obtained. As compared with the embodiment 1 in which surface contact is made with the spherical protruding portion 13b, rotation load due to contact can be reduced since line contact is made with the cylindrical protruding portion 15b.

Figure 5:
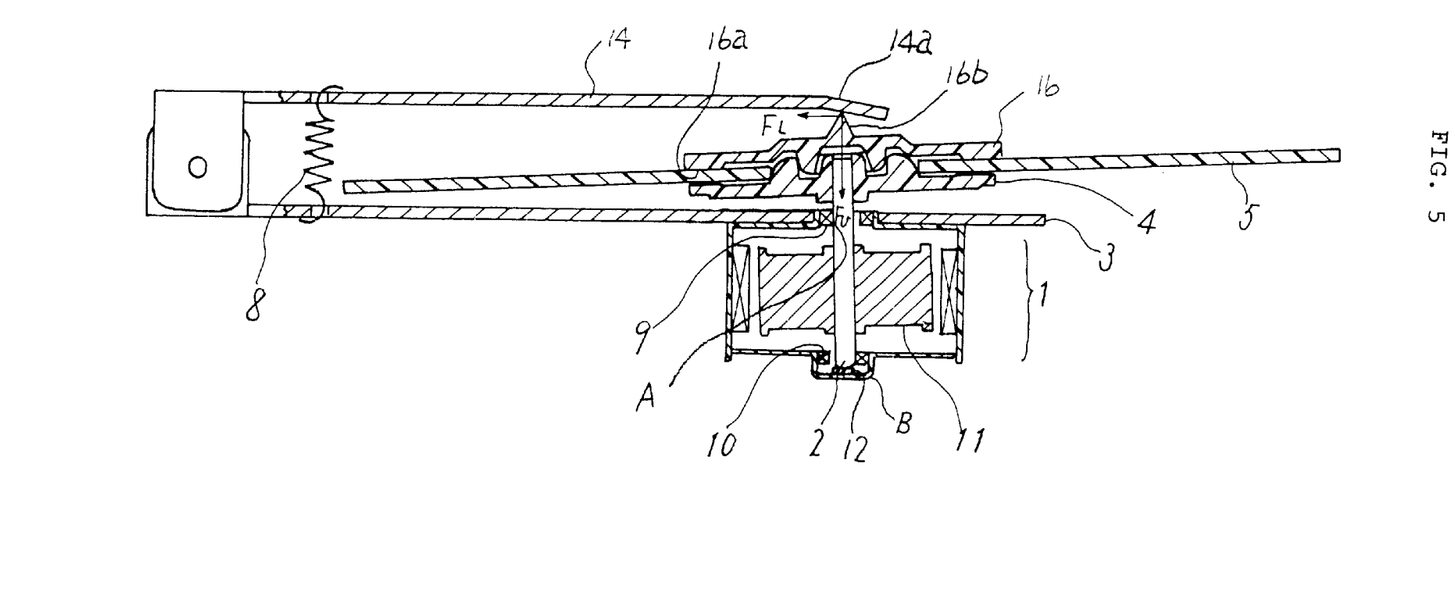
FIG. 5 is a sectional view showing a partial surface of a disk holding device according to a third embodiment of the invention.

FIG. 5 is a sectional view showing a partial surface of a disk holding device according to a third embodiment. In FIG. 5, a difference from FIG. 1 is that a disk clamping body 16 is made of polyacetal resin, and includes, at its lower part, a disk clamping portion 16a for clamping the disk 5 in the same axial direction as the motor rotating shaft 2 and, at its upper part, a conical protruding portion 16b in the same axial direction as the motor rotating shaft 2. As a result, functions and effects similar to the first embodiment are obtained. As compared with the first embodiment in which surface contact is made with the spherical protruding portion 13b, rotation load due to contact can be reduced since point contact is made with the conical protruding portion 16b.

INDUSTRIAL APPLICABILITY

As described above, a disk holding device of the invention is made a disk holding device which can suppress the occurrence of end play (shaft backlash) becoming precession of a motor rotating shaft of a driving motor, and is suitably used for a disk driving device for an optical disk device and a magneto-optical disk device.

What is claimed is:

1. A disk holding device comprising:
   a driving motor;
   a motor rotating shaft protruding upward from the driving motor;
   an upper bearing and a lower bearing disposed at an upper portion and a lower portion of the driving motor and rotatably supporting the motor rotating shaft;
   a turntable which is fitted coaxially to the motor rotating shaft at the protruding side of the motor rotating shaft and mounts a disk;
   a disk clamping member which includes, at its lower part, a disk clamping portion for clamping the disk in the same axial direction as the motor rotating shaft and, at its upper part, a protruding portion in the same axial direction as the motor rotating shaft;
   a motor fixing mount to which the driving motor is fixed; and
   a pressing member, one end of which is pivotally attached to the motor fixing mount, the other end of which includes an inclined portion with an inclination angle of 95° to 104° with respect to an axis of the motor rotating shaft, and which presses the protruding portion at the upper part of the disk clamping member in an axial direction of the motor rotating shaft and in a direction perpendicular to the motor rotating shaft; and
   wherein clearance of x is set within an aperture formed by the disk and between the turntable and the disk clamping member.

2. The disk holding device as set forth in claim 1, wherein the protruding portion of the disk clamping member pressed by the inclined portion of the pressing member has a spherical shape.

3. The disk holding device as set forth in claim 1, wherein the protruding portion of the disk clamping member pressed by the inclined portion of the pressing member has a cylindrical shape.

4. The disk holding device as set forth in claim 1, wherein the protruding portion pressed by the inclined portion of the pressing member has a conical shape.

5. The disk holding device as set forth in claim 1, wherein the inclined portion of the pressing member presses the protruding portion at the upper part of the disk clamping member such that the motor rotating shaft is always brought to contact with the upper bearing and the lower bearing.

6. The disk holding device as set forth in claim 1, wherein the inclined portion of the pressing member presses the protruding portion at the upper part of the disk clamping member such that no sliding occurs between the disk and the disk clamping member.

7. The disk holding device as set forth in claim 1, wherein a coefficient of friction between the disk and the disk clamping member is 0.25 to 0.3.

8. The disk holding device as set forth in claim 1, wherein the disk is made of polycarbonate resin and the disk clamping member is made of polyacetal resin.

9. The disk holding device as set forth in claim 1, wherein the disk clamping member forms in one member, at its lowest part, the disk clamping portion for clamping the disk in the same axial direction as the motor rotating shaft and, at its upper part of the disk clamping portion, the protruding portion in the same axial direction as the motor rotating shaft.

10. A disk holding device comprising:
    a driving motor;
    a motor rotating shaft protruding upward from the driving motor;
    a turntable which is fitted coaxially to the motor rotating shaft at the protruding side and mounts a disk;
    a disk clamping member which includes, at its lower part, a disk clamping portion for clamping the disk in the same axial direction as the motor rotating shaft and, at its upper part, a protruding portion in the same axial direction as the motor rotating shaft; and
    a pressing member which includes, at its part, an inclined portion with an inclination angle of 95° to 104° with respect to an axis of the motor rotating shaft, and presses the protruding portion of the disk clamping member in an axial direction of the motor rotating shaft and in a direction perpendicular to the motor rotating shaft; and
    wherein clearance of x is set within an aperture formed by the disk and between the turntable and the disk clamping member.

11. The disk holding device as set forth in claim 10, wherein the inclined portion of the pressing member presses the protruding portion at the upper part of the disk clamping member such that the motor rotating shaft is always brought into contact with an upper and lower portion of the motor.

12. The disk holding device as set forth in claim 10, wherein the inclined portion of the pressing member presses the protruding portion at the upper part of the disk clamping member such that no sliding occurs between the disk and the disk clamping member.

13. The disk holding device as set forth in claim 10, wherein a coefficient of friction between the disk and the disk clamping member is 0.25 to 0.3.

14. The disk holding device as set forth in claim 10, wherein the disk is made of polycarbonate resin and the disk clamping member is made of polyacetal resin.

15. The disk holding device as set forth in claim 10, wherein the disk clamping member forms in one member, at its lowest part, the disk clamping portion for clamping the disk in the same axial direction as the motor rotating shaft and, at its upper part of the disk clamping portion, the protruding portion in the same axial direction as the motor rotating shaft.

16. A disk holding device comprising:
    a driving motor;
    a motor rotating shaft protruding upward from the driving motor;
    an upper bearing and a lower bearing disposed at an upper portion and a lower portion of the driving motor and rotatably supporting the motor rotating shaft;

a turntable which is fitted coaxially to the motor rotating shaft at the protruding side of the motor rotating shaft and mounts a disk;

a disk clamping member which includes, at its lower part, a disk clamping portion for clamping the disk in the same axial direction as the motor rotating shaft and, at its upper part, a protruding portion in the same axial direction as the motor rotating shaft;

a motor fixing mount to which the driving motor is fixed; and a pressing member, one end of which is pivotally attached to the motor fixing mount, the other end of which includes an inclined portion with an inclination angle of 95° to 104° with respect to an axis of the motor rotating shaft, and which presses the protruding portion at the upper part of the disk clamping member in an axial direction of the motor rotating shaft and in a direction perpendicular to the motor rotating shaft, wherein a predetermined coefficient of friction exists between the disk and the disk clamping member based on the materials from which the disk and the disk clamping member are made, wherein the inclination angle of the inclined portion of the pressing member is determined such that:

a) the motor rotating shaft is always brought into contact with the upper bearing and the lower bearing, and b) no sliding occurs between the disk and the disk clamping member, based on the predetermined coefficient of friction; and wherein clearance of x is set within an aperture formed by the disk and between the turntable and the disk clamping member.

17. The disk holding device as set forth in claim 16, wherein the predetermined coefficient of friction is 0.25 to 0.3.

18. The disk holding device as set forth in claim 16, wherein the disk is made of polycarbonate resin and the disk clamping member is made of polyacetal resin.

19. The disk holding device as set forth in claim 16, wherein the disk clamping member forms in one member, at its lowest part, the disk clamping portion for clamping the disk in the same axial direction as the motor rotating shaft and, at its upper part of the disk clamping portion, the protruding portion in the same axial direction as the motor rotating shaft.

* * * * *